Aug. 23, 1955  J. L. BLAYNEY  2,716,231
MIRROR POSITIONING DEVICE FOR CATHODE RAY TUBE
Filed Oct. 10, 1951  2 Sheets-Sheet 1
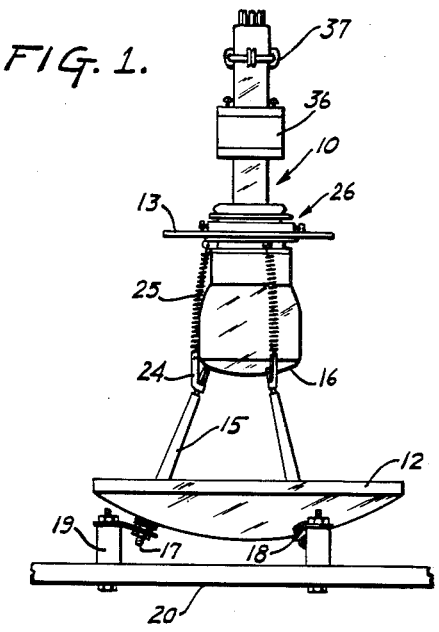
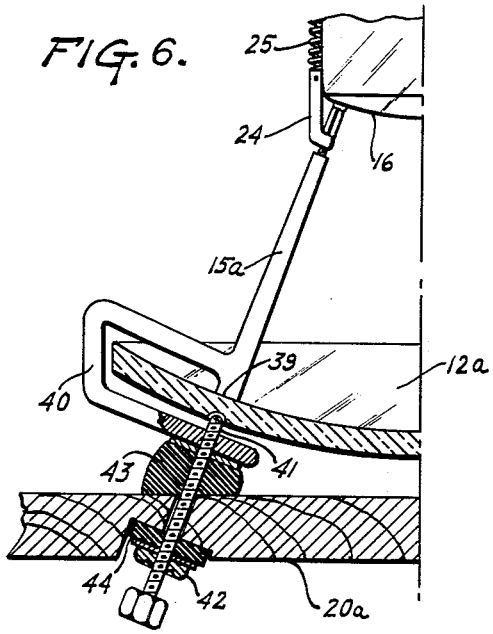
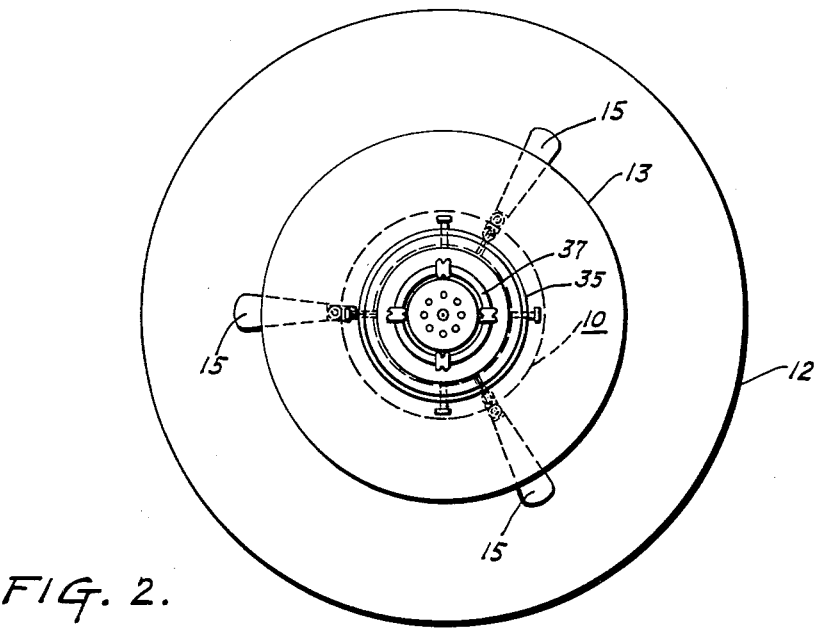
INVENTOR.
JAMES LEONARD BLAYNEY
BY
Brown, Jenk & Lynnestvedt
AGENTS Aug. 23, 1955   J. L. BLAYNEY   2,716,231
MIRROR POSITIONING DEVICE FOR CATHODE RAY TUBE
Filed Oct. 10, 1951   2 Sheets-Sheet 2
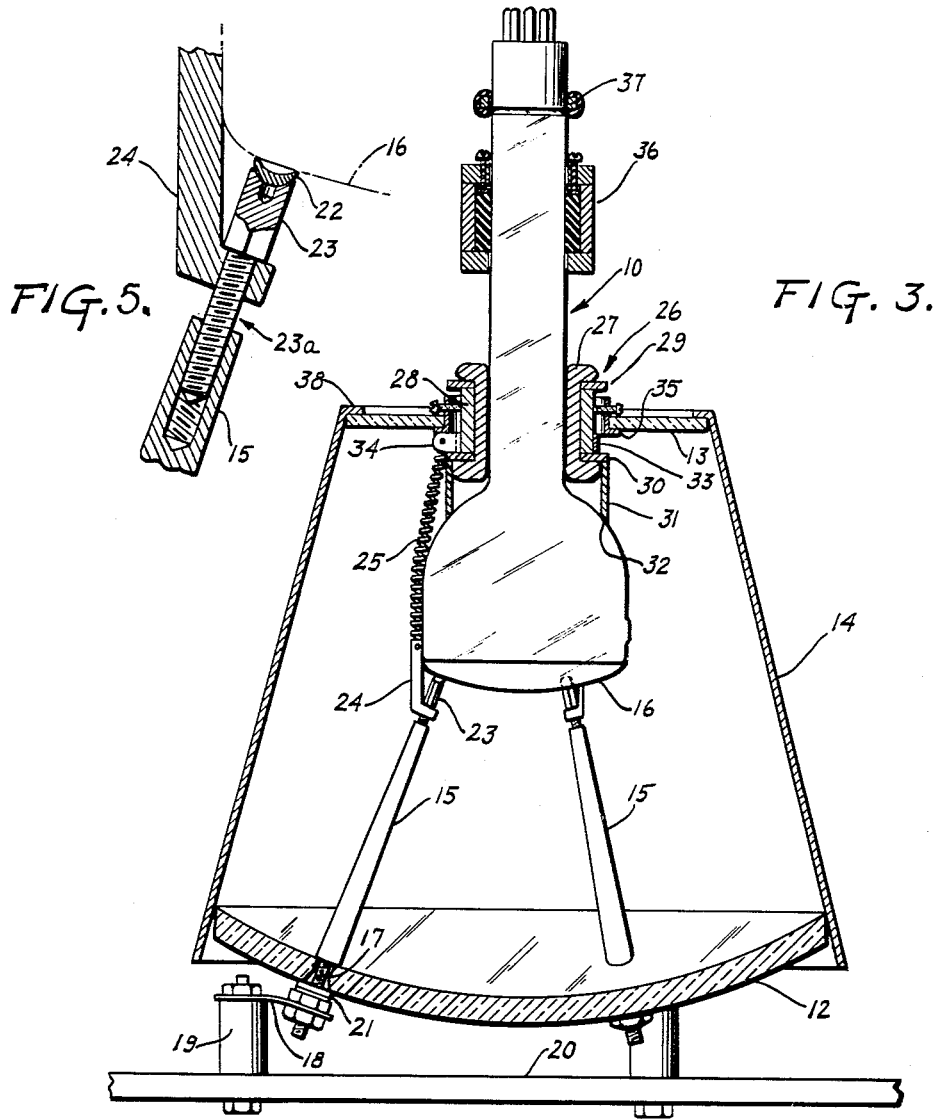
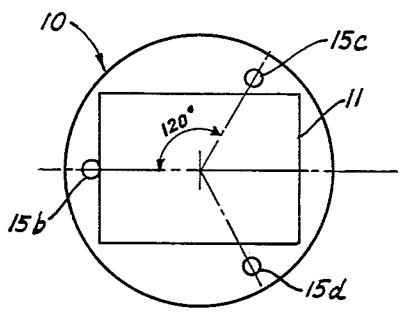
INVENTOR.
JAMES LEONARD BLAYNEY
BY
Brown, Jenk & Lynnestvedt
AGENTS United States Patent Office 2,716,231
Patented Aug. 23, 1955

2,716,231

MIRROR POSITIONING DEVICE FOR CATHODE RAY TUBE

James Leonard Blayney, Lansdale, Pa., assignor to Philco Corporation, Philadelphia, Pa., a corporation of Pennsylvania Application October 10, 1951, Serial No. 250,761

11 Claims. (Cl. 340—370)

My invention is concerned with projection type image-forming optical systems and relates especially to systems incorporating adjustable support for cathode ray tubes used in projection television receivers.

In such receivers, as well as in certain other projection apparatus to which the concepts of the invention are applicable, it is necessary to effect precisely controlled relative movement between the cathode ray tube, upon the screen of which a raster or primary image is scanned, and certain optical elements which define an optical axis. Such movement is required to achieve proper focus of the ultimate image as projected upon a viewing surface or screen.

The present invention is particularly useful in projection television receivers utilizing a "Schmidt" type reflective optical system, that is, receivers which include a spherical mirror and an aspherical zone or correcting plate between which elements there is arranged a cathode ray tube, said mirror and plate defining an optical axis. A television receiver of the general type to which the invention is particularly applicable is disclosed and claimed in the patent to E. T. Traub, No. 2,466,338, which issued April 5, 1949, as assigned to the assignee of the present invention.

Broadly, my invention has an object the provision of novel means for rigidly supporting a cathode ray tube in predetermined spaced relation with respect to a concave mirror.

Another important object of this invention is to provide for relative adjustment between a cathode ray tube and concave mirror in such manner that extremely accurate and positive focus adjustments may be readily accomplished, even by relatively unskilled persons.

To this general end, a preferred embodiment of my invention provides for support of the cathode ray tube through the agency of a plurality of elongated support members or struts extending between the mirror and the tube face, and being so shaped and disposed as to be subject to compressional stresses only. These struts are adjustable axially, and individually, to afford the precise focusing referred to.

Utilization of the apparatus of the invention results in a number of significant advantages, among the more important of which are the following:

A. The precision and controllability of the apparatus are such that visible astigmatism and de-focusing are eliminated.

B. The adjustable tube supporting apparatus is of unusual rigidity, and the possibility of loss of proper focus, after adjustment of the equipment is virtually eliminated.

C. The mirror is supported in such a way as to eliminate internal stresses commonly encountered in arrangements of the prior art.

D. The individual mechanical parts of the device are inexpensive and may be readily assembled.

E. The dust-resistant housing may be removed and the optical surfaces may be cleaned without de-focusing or disassembly of the tube support means.

F. The tube, as well as its focus unit and deflection yoke, may be removed and replaced without the necessity of resetting the optical focus.

The manner in which the foregoing and other objects and advantages of my invention may best be achieved, will be understood from the following description and claims, considered in conjunction with the accompanying drawings which form part of this disclosure and in which preferred embodiments of my invention are illustrated.

In the drawings:

Figure 1 is a side elevational view of a cathode ray tube and mirror assembly incorporating focusing apparatus constructed in accordance with the invention;

Figure 2 is a plan view, on an enlarged scale, of the apparatus illustrated in Figure 1;

Figure 3 is a vertical, sectional illustration of the embodiment shown in elevation in Figure 1;

Figure 4 is a diagrammatic view representing the tube face and showing the raster thereon as well as the relative positions of said raster and the support means of my invention;

Figure 5 is a fragmentary, sectional view, on a greatly enlarged scale, illustrating the adjustable, tube-engaging end of one of the supporting members or struts; and, Figure 6 is a fragmentary elevational view illustrating certain modifications which may advantageously be made.

Now making more detailed reference to the drawings, and initially to Figures 1, 2 and 3 thereof, it will be seen that the class of projection systems to which the invention is particularly applicable includes a cathode ray tube 10 having a forwardly presented fluorescent screen or target area upon which a raster 11 is scanned (see Figure 4), the projection tube being cooperable with a concave mirror 12 and with a lens or plate 13 aspherically configured to correct for an aberration introduced by the mirror. Tube 10, mirror 12, and the lens or plate 13, are arranged as a unitary assembly enclosed in a dust-resistant housing indicated, generally, at 14.

Since a Schmidt optical system of the illustrated type is well known in optics, and since the invention is concerned with support means providing for relative adjustment of the tube and mirror, a detailed description of the optical system is not necessary herein except insofar as the elements thereof are utilized in a novel manner in accordance with the principles of my invention. If further detailed description of projection television apparatus of this general kind is desired, reference may be had to the above-identified patent to Traub.

In such projection equipment, the cathode ray tube screen must be properly oriented with respect to the optical axis defined by mirror 12 and correcting lens 13, in order that all portions of the projected image may be accurately focused upon the viewing screen (not shown).

In particular accordance with the present invention the focus requirements are taken care of by a novel mounting providing for ready and accurate relative adjustment of the tube and mirror. Specifically in the illustrated embodiment the mirror is fixedly supported upon the cabinet structure in a manner presently to be described, and it is the tube which is moved with respect to the mirror to accomplish the focusing operation. Evidently it would be possible for the tube to be maintained stationary and for the mirror to be moved with respect thereto, without departing from the concepts of the invention.

To provide for precisely controlled focus adjustments, the tube is supported upon three extensible elements or struts shown at 15, which struts are fixedly secured to the concave mirror and extend from the mirror toward and into contact with the face 16 of tube 10, upon which face appears the raster 11. Importantly the struts are so disposed as to be subject to compressional stresses only, no bending moments being introduced. Such disposition of the struts is accomplished by so positioning them in the mirror that the longitudinal axis of each strut is substantially perpendicular to the surface of both the tube face and the mirror. Ideally, in an optical system of the type to which the invention is applicable, the spherically curved surfaces of the mirror and tube face are concentric, and in such an idealized embodiment the longitudinal axis of each strut, if extended, would pass through the common center of curvature. Under such conditions only compressional stresses would be present. In practice the tube face is frequently not precisely concentric with the mirror and, to the extent that there is departure from concentricity, the longitudinal axes of the struts will not extend precisely normal to the surfaces of both the tube and mirror. However, in practice, the aforementioned departure from exact concentricity is so slight that the stresses set up in the struts are substantially entirely compressional in nature.

This feature of the invention is most important to the accomplishment of the purposes thereof and represents a major distinction which the apparatus of my invention presents over focusing devices previously known. Subjecting the struts to compressional stresses only, and the resultant exclusion of flexure, is instrumental in securing an unusually high degree of mechanical rigidity and therefore renders the apparatus susceptible of exceedingly precise adjustment. Experience with equipment of the prior art has demonstrated that displacement of a portion of the tube face toward or away from the mirror in amount no greater than 0.001" or 0.002", can result in objectionable interference with the desired focus. The apparatus of my invention meets such exact tolerances.

Preferably the struts are slightly tapered and, at the mirror-engaging end thereof each strut has an annular shoulder from which extends a threaded portion 17 passing through a suitable aperture provided in the mirror—by means of a molding or drilling operation—the threaded portion being in turn bolted to a laterally extending support member 18. The latter member is carried by a stud 19 upstanding from cabinet structure shown fragmentarily at 20. Suitable washers 21, of cork or the like, may advantageously be interposed between the rear face of the mirror and the support structure 18—19.

In the broader aspect of my invention, and in particular accordance with the first of the foregoing statements of object, the apparatus may comprise three struts the length of each of which is established within a tolerance of about 0.001", and in such an embodiment no adjustments would be required, provided that the tube face plates are held to sufficiently close tolerances. Preferably however, and because of the difficulties encountered in such closely controlled manufacture of tube face plates, provision is made for effecting axial extension and retraction of the struts in order to accomplish the aforesaid precisely controlled focusing adjustments. This portion of the device may be well understood by reference to Figure 5.

As illustrated in Figure 5 the curved face portion 16 of the tube is engaged by and supported upon generally hemispherical cup members 22 suitably seated in the upwardly presented end 23 of a short stud or extension 23a, the latter being threadedly received within the upper portion of strut 15. Although Figure 5 illustrates the tube-engaging end of only one of the struts, it will be understood that each of the struts is constructed as shown in that figure.

Rotation of the stud 23a, effectively, provides for controllable extensibility of the associated strut. The manner in which such adjustment movements are effected, and the preferred location of the point of contact between cup-shaped members 22 and the face of the tube, will be described more fully in what follows.

Each strut and stud assembly is provided with a hanger member 24 suitably apertured to accommodate the stud 23a, which is free to rotate in the aperture, the several hanger members extending upwardly along the sides of the tube, as illustrated in Figures 1 and 3, and being provided with springs 25 which react against the deflection yoke, shown generally at 26, in such manner as to cause the tube to bear firmly yet resiliently against the extensible struts 15. This relatively simple resilient device comprises the entire support for the tube and, although the tube and mirror are preferably employed vertically, as shown in the drawings, it is entirely feasible to use the equipment in such a way as to dispose the tube in horizontal position.

The deflection yoke is of known type, comprising a winding 27 and a soft iron cylinder or core 28 having at its upper and lower edges fiber washers shown at 29 and 30, respectively. An annular collar 31, preferably of fibrous material, bears against the lower washer 20 and terminates in a downwardly presented annular edge portion which contacts the back or bell of the tube, as at 32. A three-piece core clamp 33 surrounds the soft iron cylinder, in accordance with known practice, and is provided with outwardly extending lugs or ears, one of which is shown at 34. These lugs are utilized to maintain the three arcuate sections of the clamp in assembled relation, and also serve as points against which the springs 25 may react in urging the tube into firm contact with the ends of the struts. The lens or correcting plate 13 is centrally apertured and is supported upon the deflection yoke assembly, a screw-adjusted collar 35 providing for movement of the lens transversely of the optical axis. It will be noted that the lens 13 moves with the tube during focus adjustments, but this movement is not objectionable since the ultimate adjustment of the tube amounts to the summation of three individual adjustment movements which comprise rectilinear movement of the tube toward and away from the mirror.

The neck portion of the tube also carries a focusing coil 36 and a centering magnet 37, said coil and magnet being of known type and requiring no description herein.

As indicated hereinabove a dust-resistant housing 14 is provided and this housing, as clearly shown in Figure 3, has about the upper end thereof an inturned flange 38 which is adapted to rest upon the peripheral edge portion of the lens or plate 13. As will be recognized, the housing may be withdrawn upwardly along the tube, and cleaning of the optical elements of the system may then be accomplished without interference with the desired focus.

A form of the invention, modified as respects the manner in which the struts are associated with the mirror, is shown in Figure 6. In this embodiment the tube-engaging ends of the struts are counterparts of the corresponding elements, shown in the drawings illustrative of the principal embodiment thus far described.

In the embodiment of Figure 6, the tube 16 is supported upon concave mirror 12a through the agency of three struts one of which is illustrated at 15a. Each strut has a lower portion 39 which is spherical, being configured to bear against the mirror 12a, and each strut is further provided with a C-shaped extension 40 having threadedly received therein an adjustable screw member 41. The mirror has a suitable indentation to receive the end of the adjusting screw 41 and, preferably, a rubber or cork pad is inserted between the screw and the mirror. Fixed cabinet structure, shown fragmentarily at 20a, is adapted to receive the adjusting screw 41, and a lock nut 42 serves to draw the C-shaped extension 40 of strut 15a toward the upper surface of the cabinet wall, the clamping pressure being exerted through a pair of rubber washers 43 and 44. This form of the apparatus is of advantage in that it is not necessary to provide an aperture extending through the mirror.

As respects both embodiments, the mode of operation will be more clearly understood from what follows, particular reference being had to Figures 3, 4 and 5.

Considering, initially, the fabrication of the device, the struts 15 are first assembled to the mirror and the illustrated retaining nuts are drawn upwardly against the washers 21. In this way the mirror and the struts are fixedly secured to one another and the mirror, in turn, is resiliently supported upon the studs 19, the support members 18 functioning somewhat as cantilever springs. At this stage of the assembly the tube is preferably added, it being understood that the tube, prior to mounting, carries the centering magnet and the deflection yoke assemblies, as well as the correcting lens 13. The tube is placed upon the upwardly presented cup-shaped elements 22, being securely maintained in that position by the springs 25 which interconnect hanger members 24 with lugs 34.

Prior to establishing the desired focus it is of course necessary that the position of the raster upon the screen be determined, and that care be exercised to be sure that the tube is so positioned as to locate the upper ends of the struts properly, with respect to the raster. The position of the raster is established by operation of the focusing and deflection elements, in known manner, and, with the raster present upon the screen, the tube is positioned with respect to the struts as shown diagrammatically in Figure 4. If the raster is properly centered upon the face of the tube, it is a simple matter to position the tube so that the tube-engaging ends of the struts engage said tube at points radially equidistant from the center of the tube. As illustrated in Figure 4 the struts are spaced apart 120° and one thereof is disposed tangent to one of the shorter sides of the raster, adjacent the midpoint of said side. The proper position of the other two struts will be understood without description, from inspection of Figure 4, it being borne in mind that the struts are so positioned in the mirror as to ensure that the longitudinal axis of each strut is substantially perpendicular to the surfaces of both the mirror and the tube face.

Focus adjustments are carried out by varying the extension of the struts, individually, in the manner set forth above, adjustment of each of the three struts effecting rotation of the tube face about a line defined by the points at which the other two struts contact the tube face.

Selecting, for example, strut 15b, as illustrated in Figure 4, adjustment of the threaded extension 23a of that strut serves to vary the focusing of a generally semicircular portion of the picture adjacent to said strut 15b. When this portion of the picture appears to be in satisfactory focus, similar manipulation of strut 15c is effected, after which adjustment is made of the third strut, 15d. It has been found, in practice, that this operation can be carried out very rapidly and accurately, even by relatively unskilled persons. In large part the ease and accuracy with which focusing can be accomplished results from the rigidity of the mounting assembly, and the micrometric adjustment movements of which it is capable. It is to be borne in mind that adjustment of each strut affects the focus in the vicinity of said strut, but produces little change in the focus prevailing in the vicinity of the other two struts. Therefore, and as aforesaid, the adjustment procedure is carried out in very simple manner by manipulating the threaded extensions of each of the three struts, independently, until all portions of the picture are in satisfactory focus.

Unlike many focusing devices previously known, translational movement of the tube along its major axis is not necessary, adjustment of the struts being all that is required to effect three-dimensional focusing. This will be seen to be the case when it is recognized that extension and retraction of each strut causes pivotal movement of the face of the tube about a line which does not pass through the center of said tube. Adjustment of each strut therefor results in effecting a corresponding slight adjustment of the tube along its axis. Achievement of satisfactory focus in the vicinity of each of the three spaced struts is all that is required.

From the foregoing description it will be understood that the apparatus of the present invention provides adjustable mounting structure by means of which a cathode ray tube may be given precise, three-dimensional orientation with respect to the optical axis defined by a mirror and correcting lens. Further, the apparatus is of such a character that the possibility of inadvertent loss of the desired adjustment is almost completely eliminated.

I claim:

1. In a projection optical system for television apparatus of the type including a cathode ray tube having an image screen at the face thereof and a concave mirror member operable to project images appearing on the raster area of said screen, mechanism for rigidly positioning the cathode ray tube in predetermined spaced relation with respect to the concave mirror to insure proper focus in the system, said mechanism comprising a plurality of strut elements secured to surface portions of said mirror member and extending toward said tube face, said strut elements bearing against the tube face at spaced regions adjacent said raster area and the longitudinal axis of each of said strut elements being substantially perpendicular to the said surface portions of both said tube face and said mirror member, whereby the stresses to which said strut elements are subjected are substantially entirely compressional in nature, and means reacting between said tube and said strut elements and providing a force effective to maintain the bearing relation.

2. In a projection optical system for elevision apparatus of the type including a cathode ray tube having an image screen at the face thereof and a concave mirror member operable to project images appearing on the raster area of said screen, mechanism for controllably effecting relative movement between said tube face and mirror member to effect a focusing adjustment in said system, said mechanism comprising a plurality of extensible and retractable strut elements supported upon surface portions of said mirror member and extending directly toward said tube face, said strut elements bearing against the tube face at spaced regions adjacent said raster area and the longitudinal axis of each of said strut elements being substantially perpendicular to the said surface portions of both said tube face and said mirror member, whereby the stresses to which said strut elements are subjected are substantially entirely compressional in nature.

3. A system as set forth in claim 2, and further characterized in that said strut elements are secured to said mirror member.

4. A system as set forth in claim 2, and further characterized in that said strut elements are secured in the reflective surface of said mirror member.

5. A system set forth in claim 2, and in which each strut element includes means threadedly associated therewith and providing the stated extensibility and retractability.

6. A system as set forth in claim 5, and in which each such means rotatably carries a generally cup-shaped member bearing against the tube face.

7. A system as set forth in claim 1, and further characterized in that the last-mentioned means comprises first portions carried by said strut elements, second portions carried by said tube, and resilient means interconnecting said first and second portions and embracingly engaging laterally presented portions of said tube toward the face end thereof.

8. A system as set forth in claim 7, and in which the said second portions are supported upon deflection yoke means carried by the neck of the tube.

9. A system as set forth in claim 2, and further characterized in that said strut elements are secured in and pass through said mirror member and terminate in end portions adapted for securement to fixed cabinet structure.

10. A system as set forth in claim 2, and further characterized in that each of said strut elements is provided with generally C-shaped clamp means extending across an edge of the mirror member and engaging the front and back thereof at opposed points.

11. In a projection optical system for television apparatus of the type including a cathode ray tube having an image screen at the face thereof and a concave mirror member operable to project images appearing on the raster area of said screen, mechanism for rigidly positioning the cathode ray tube in predetermined spaced relation with respect to the concave mirror to insure proper focus in the system, said mechanism comprising a plurality of strut elements extending between surface portions of said mirror member and said tube face, said strut elements bearing against the tube face at spaced regions adjacent said raster area and the longitudinal axis of each of said strut elements being substantially perpendicular to the said surface portions of both said tube face and said mirror member, whereby the stresses to which said strut elements are subjected are substantially entirely compressional in nature, and a plurality of spring devices each disposed to react between said tube and an associated one of said strut elements to maintain the bearing relation, said devices also embracingly engaging side surface portions of said tube adjacent the face thereof and tending to center the same with respect to said strut elements.

References Cited in the file of this patent

UNITED STATES PATENTS

| | | | |
|---|---|---|---|
| 1,313,739 | Ryerson | Aug. 19, | 1919 |
| 1,881,525 | Halpern | Oct. 11, | 1932 |
| 2,455,476 | Epstein | Dec. 7, | 1948 |
| 2,512,061 | Huck | June 20, | 1950 |
| 2,513,723 | Greenwood | July 4, | 1950 |
| 2,520,190 | Amdursky | Aug. 29, | 1950 |
| 2,545,525 | Maloff | Mar. 20, | 1951 |
| 2,571,233 | Groenenberg | Oct. 16, | 1951 |

FOREIGN PATENTS

| | | | |
|---|---|---|---|
| 309,334 | Italy | Oct. 3, | 1933 |
| 596,432 | Great Britain | Jan. 5, | 1948 |